Feb. 24, 1948.   L. T. SACHTLEBEN   2,436,671
OPTICAL SYSTEM FOR SOUND RECORDING
Filed Dec. 14, 1943
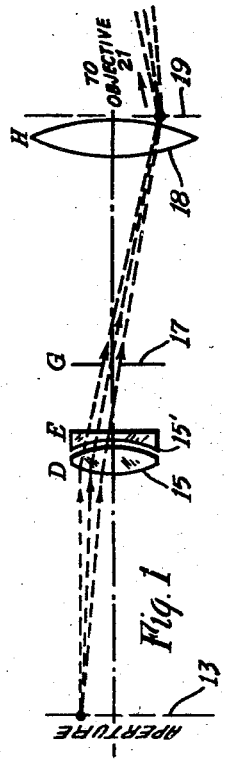
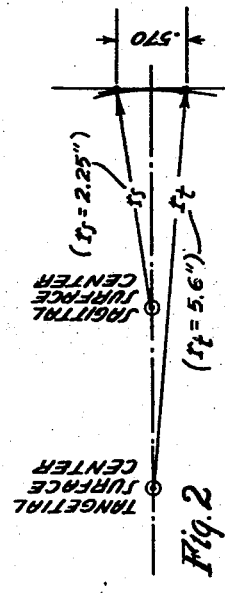
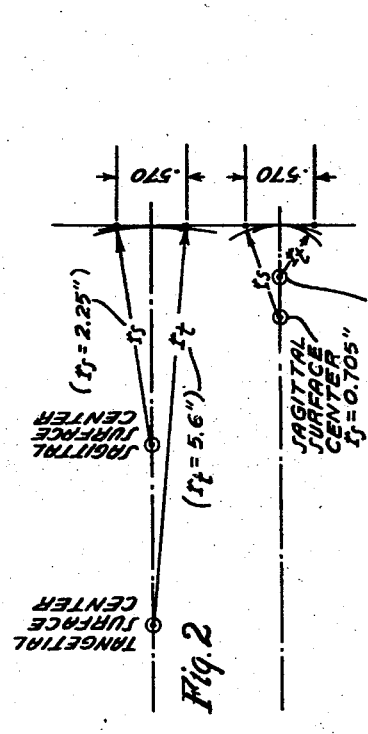
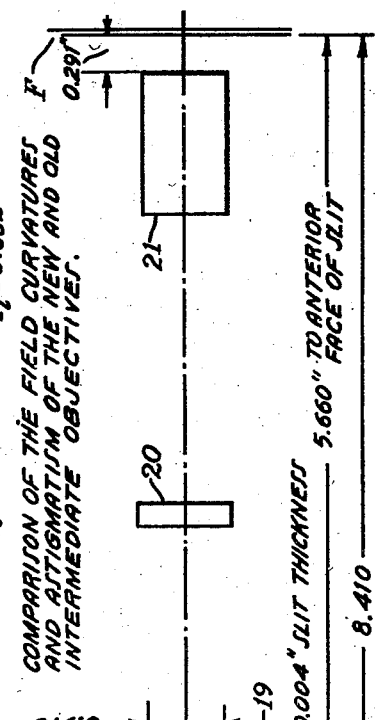
Inventor
Laurence T. Sachtleben
By
Attorney Patented Feb. 24, 1948

2,436,671

UNITED STATES PATENT OFFICE 2,436,671

OPTICAL SYSTEM FOR SOUND RECORDING

Lawrence T. Sachtleben, Indianapolis, Ind., assignor to Radio Corporation of America, a corporation of Delaware Application December 14, 1943, Serial No. 514,225

11 Claims. (Cl. 88—24)

This invention relates to an optical system for recording sound photographically on film. The system may be used for either variable density or variable area recording, depending on the type of apertures used and the arrangement of the galvanometer.

The primary features of the present invention are improved definition through a modification of the lens system and the moving of the light source away from the recorder mechanism. This is accomplished by new designs of lenses in the system and by a reflecting prism which shifts the optical axis in the horizontal plane.

One object of the invention is to provide a recording optical system giving improved definition.

Another object of the invention is to provide a recording optical system giving improved definition of the recording aperture upon the slit plate.

Another object of the invention is to provide a recording optical system in which the light source is moved away from the recording apparatus.

Another object of the invention is to provide a recording optical system in which the light source is sufficiently removed from the recording apparatus to preclude effects thereon from the heat of the recording lamp.

Other and incidental objects of the invention will be apparent from a reading of the following specification and an inspection of the accompanying drawing in which:

Figure 1 is a schematic diagram of the optical system from the aperture to the slit plate;

Figure 2 is a diagram of the image form in the present device;

Figure 3 is a diagram of the image form in prior devices; and

Figure 4 is a plan view of the present optical system.

Referring to the drawing, Fig. 4 which is a schematic of the complete recording optical system embodying the invention:

The filament of the lamp 10 is focused by the condensing lenses 11 and 12, and the intermediate objective lenses 15 and 15', upon the galvanometer mirror 17. The condenser 18 in turn focuses the mirror 17 upon some plane within the objective lens 21. The aperture 13 adjacent condenser lenses 11, 12 is focused by the intermediate objective lenses 15 and 15' and the condenser 18 upon the slit 19 just beyond and adjacent to lens 18. The slit is in turn focused by the objective lens 21 upon the film strip F. The prism 14 serves to introduce a right angle bend into the system for the sake of a better mechanical arrangement of the parts of the system. This prism removes the exciter lamp from the immediate vicinity of the film moving mechanism and instead of the dimensions of the optical system being determined by the proximity of the lamp to the film moving mechanism the dimensions are determined by the optical factors involved. The exciter lamp is of a conventional type and preferably has a curved 10-volt, 75-watt, helical filament, of the type described in U. S. Patent No. 2,158,308. The element 20 is a suitable filter such as Corning No. 584, or Corning No. 597 filter glass which has a peak transmission in the neighborhood of 3650 angstrom units of wavelength. A dust window for the galvanometer is provided at 16.

Referring to Fig. 1, my device includes the air spaced lenses 15 and 15' which, together with the aperture (galvanometer mirror) 17, constitute an intermediate objective which produces an image of the aperture 13 upon the plane of the slit 19 in the presence of the condenser lens 18. The combination of lenses 15 and 15' with the aperture 17 will afterward be referred to as the "objective." The working numerical aperture of the "objective" is approximately N. A. 0.023 in the image space. The "objective" is corrected to unite the images at 3650 angstroms and 5460 angstroms, and in combination with the lens 18 it produces an image at the slit plane which is well corrected for distortion and coma to a distance of 0.285" from the axis. The astigmatism and curvature of image have been reduced considerably below the experienced with a cemented doublet type of objective formerly used. A small amount of residual spherical aberration, which could not be avoided if the astigmatism and curvature were to be reduced, is reduced to less than half the allowable tolerance for spherical aberration at the stated numerical aperture. Spherical aberration at the edge of the field is approximately one-half of its value at the center of the field. All aberrations are computed at 3650 angstrom units of wavelength, and include the effects of the condenser 18. The true image surface is slightly "round" or convex toward the ideal image surface and the tangential curvature, 0.285" from the axis, is $X'_T = -0.009''$ as indicated in Fig. 2. The corresponding sagittal curvature is $X'_S = -0.018''$. Measurements made upon the image produced by the cemented doublet type of "objective," in the presence of the slit condenser, show $X'_T = -0.130''$ and $X'_S = -0.060''$ as indicated in Fig. 3. The old "objective" thus had much greater curvature and about 0.070" of undercorrected astigmatism. The new "objective" of this invention has about 0.011" of overcorrected astigmatism. This objective 15, 15' is corrected for coma and its field flattened when the flint element and the diaphragm are both on the same side of the crown element. If they are on opposite sides at the crown element the results are not so satisfactory.

The curvatures $X'_s$ and $X'_T$ are measured from the best axial image plane to the best sagittal and tangential image foci respectively, in a direction parallel to the axis of the system.

Figs. 2 and 3 show a comparison between the two images as to curvature and astigmatism for a normal image diameter of 0.570". The chromatic correction of an air-spaced lens of simple crown and flint elements, such as this, is unstable, and the lens therefore has some uncorrected transverse chromatic aberration. This is because the chromatic aberration cannot be corrected for both the position of the object and of the stop, in a chromatically unstable lens, and transverse chromatic aberration is chromatic aberration of the stop position. (See Conrady "Applied Optics and Optical Design," part 1, page 149.)

The components of the objective are specified as follows, the surfaces being numbered in the order in which they are passed by the light:

Crown component 15—Dense barium crown glass, $N_D = 1.6088$, $V = 57.2$.

$R_1 = 0.8011''$ convex
$R_2 = 1.2482''$ convex } Center thickness = 0.1882''.

Air space = 0.0553''.

Flint component 15'—Extra dense flint glass,
$N_D = 1.6490$, $V = 33.8$.

$R_3 = 0.9509''$ concave
$R_4 = 6.2712''$ concave } Center thickness = 0.0650''.

Aperture to first crown surface = 3.4195''.
Second flint surface to stop = 1.098''.
Second flint surface to condenser = 3.560''.
Condenser 18—Spectacle crown glass,
$N_D = 1.523$, $V = 58.6$.

$R_5 = 2.219''$ convex
$R_6 = 1.588''$ convex } Center thickness = 0.250''.

Second condenser surface to image of aperture = 0.032''.

In prior optical systems of this general type the lamp and aperture are located on the optical axis from the galvanometer mirror 17 through the center of the lens 15 so that the recording lamp was necessarily close to the recording apparatus and adversely affected the recording apparatus by the heat and particularly by the unequal heating thereof. In the present arrangement, due to the use of the prism 14 the lamp is considerably removed, and due to this removal it does not adversely affect the recording mechanism. In addition, it provides more flexibility in the design of the optical system.

The recording objective 21 is a commercial recording objective of 16 mm. focal length and N. A. 0.25 such as the Bausch and Lomb No. 41-87-50.

In the system above described the galvanometer mirror moves about a horizontal axis and the aperture in the plate 13 is defined by diagonal edges so that the intersection of the diagonal images with the slit define a line of light of varying length. However, with substantially the same arrangement and with a change in the aperture, variable density recording can be accomplished by the penumbra method or the galvanometer mirror may be caused to rotate around a vertical axis and the image of the aperture moved horizontally across the slit.

I claim as my invention:

1. In a sound recording optical system having in sequence an exciter lamp, condenser lenses, an aperture plate, a reflecting prism, a galvanometer mirror intersecting the optical axes at an acute angle vibratable around a fixed axis and serving also as a lens diaphragm, a condenser lens, a slit plate closely adjacent said condenser lens, and an objective to image the slit on a photographic surface: an optical unit interposed between said reflecting prism and said mirror, said optical unit comprising a spaced achromatic pair of crown and flint lenses being so shaped and air-spaced from each other and spaced with respect to said mirror and slit plate that the principal ray of any one pencil forming an image at said slit plate of a point in the aperture of said aperture plate passes through a different part of said crown and flint lenses from that traversed by the principal ray of any other pencil from any other point in said aperture to substantially correct the image curvature and astigmatism arising in said optical unit itself and in said condenser lens located at said slit plate.

2. An optical unit in accordance with claim 1, in which said flint lens is located intermediate said crown lens and said mirror, and the distance from said mirror to the adjacent surface of said flint lens is less than the equivalent focal length of the combination of said crown and flint lenses and more than half the equivalent focal length of said combination.

3. In a sound recording optical system having in sequence an exciter lamp, condenser lenses, an aperture plate, a reflecting prism, a galvanometer mirror vibratable around a fixed axis and serving also as a lens diaphragm, a condenser lens, a slit plate closely adjacent said condenser lens, and an objective to image the slit on a photographic surface: an optical unit comprising an air-spaced achromatic pair of crown and flint lenses positioned intermediate said reflecting prism and said mirror, said pair of crown and flint lenses being so shaped and spaced from each other and spaced with respect to said mirror, condenser lens, and slit plate, that the principal ray of any one pencil forming an image at said slit plate of a point in the aperture in said aperture plate passes through a different part of said pair of lenses from that traversed by the principal ray of any other pencil associated with any other point in said aperture to substantially correct the image curvature and astigmatism arising in said optical unit itself and in said condenser lens located at said slit plate.

4. An optical unit in accordance with claim 3, in which said flint lens is positioned intermediate said crown lens and said mirror, and the distance from said mirror to the adjacent principal plane of said optical unit is less than the equivalent focal length of the unit and more than half the equivalent focal length of the unit.

5. In a sound recording optical system having in sequence an exciter lamp, condenser lenses, an aperture plate, a reflecting prism, a galvanometer mirror vibratable around a fixed axis and serving also as a lens diaphragm, a condenser lens, a slit plate adjacent said condenser lens, and an objective to image the slit on a photographic surface: an optical unit comprising an air-spaced achromatic pair of crown and flint lenses positioned intermediate said reflecting prism and said mirror, said crown lens having a "V" value of substantially 57.2 and a center thickness of substantially 0.1882 inch, and said flint lens having a "V" value of substantially 33.8 and a center thickness of substantially 0.0650 inch, said lenses being separated substantially 0.0553 inch, said unit being so spaced with respect to said mirror and said slit plate that the principal ray of any one pencil forming an image at said slit plate of a point in the aperture of said aperture plate passes through a slightly different part of said pair of lenses from that traversed by the principal ray of any other pencil associated with any other point in said aperture to substantially correct the image curvature and astigmatism arising in said optical unit itself and in said condenser lens at said slit plate.

6. An optical unit in accordance with claim 5, in which said flint lens is positioned intermediate said crown lens and said mirror, and the algebraic difference of the surface curvatures of said crown lens numerically exceeds the equivalent focal length of said optical unit and the algebraic difference of the surface curvatures of said flint lens numerically exceeds half the equivalent focal length of said optical unit.

7. In a sound recording optical system having in sequence an exciter lamp, condenser lenses, an aperture plate, a reflecting prism, a galvanometer mirror vibratable around a fixed axis and serving also as a lens diaphragm, a condenser lens, a slit plate closely adjacent said condenser lens, and an objective to image the slit on a photographic surface: an optical unit comprising a spaced achromatic pair of crown and flint lenses intermediate said reflecting prism and said mirror, said crown lens having a "V" value of substantially 57.2 and an $N_D$ value of substantially 1.6088, and said flint lens having a "V" value of substantially 33.8 and an $N_D$ value of substantially 1.6490, said crown and flint lenses being so spaced with respect to said aperture plate, mirror, condenser lens, and slit plate that the principal ray of any one pencil forming an image at said slit plate of a point in the aperture of said aperture plate passes through a different part of said optical unit from that traversed by the principal ray of any other pencil associated with any other point in said aperture to substantially correct the image curvature and astigmatism arising in said optical unit itself and in said condenser lens at said slit plate.

8. An optical unit in accordance with claim 7, in which the ratio of the algebraic difference of the surface curvatures of said flint lens to the algebraic difference of the surface curvatures of said crown lens numerically exceeds 0.5.

9. In a sound recording optical system having in sequence an exciter lamp, condenser lenses, an aperture plate, a reflecting prism, a vibratable galavanometer mirror serving as a lens diaphragm, a condenser lens, a slit plate closely adjacent said condenser lens, and an objective to image the slit on a photographic surface: an optical unit comprising a spaced achromatic pair of dense barium crown and extra dense flint lenses positioned intermediate said reflecting prism and said mirror, the ratio of the radius of one surface of said crown lens to the curvature of the opposite surface of said crown lens being numerically in excess of .9 and less than 1.1, and the ratio of the long to the short radius of said flint lens being numerically in excess of 5.

10. An optical unit accordance with claim 9, in which the ratio of the axial thickness of said crown lens to the equivalent focal length of the combination of said crown and flint lenses is in excess of 0.10 and the ratio of the axial air space between said crown and flint lenses to the equivalent focal length of the combination of said lenses is in excess of 0.01.

11. In a sound recording optical system having in sequence an exciter lamp, condenser lenses of substantially one inch in diameter, an aperture plate, a reflecting prism, a vibratable galvanometer mirror serving as a lens diaphragm, a condenser lens, a slit plate closely adjacent thereto, and an objective to image the slit on a photographic surface: an optical unit positioned intermediate said reflecting prism and said mirror, said unit including a spaced achromatic pair of crown and flint lenses of substantially 0.720 inch diameter, said crown lens having a center thickness of substantially 0.1882 inch and said flint lins having a center thickness of substantially 0.0650 inch, the difference between the axial thickness of said crown lens and the axial thickness of said flint lens exceeding 5 percent of the equivalent focal length of the crown and flint lens combination.

LAWRENCE T. SACHTLEBEN.

REFERENCES CITED

The following references are of record in the file of this patent:

UNITED STATES PATENTS

| Number | Name | Date |
|---|---|---|
| 415,040 | Hastings | Nov. 12, 1889 |
| 1,139,476 | Blondel | May 18, 1915 |
| 1,616,751 | Konig | Feb. 8, 1927 |
| 1,740,673 | Whittaker | Dec. 24, 1929 |
| 1,847,636 | Taylor | Mar. 1, 1932 |
| 2,102,778 | Hasbrouck | Dec. 21, 1937 |
| 2,121,568 | Newcomer | June 21, 1938 |
| 2,173,266 | Sachtleben | Sept. 19, 1939 |
| 2,244,733 | Schwarz | June 10, 1941 |
| 2,312,259 | Maurer | Feb. 23, 1943 |

OTHER REFERENCES

Dimmick, Jour. Soc. Motion Pict. Engrs. 29, No. 3, 1937, pp. 258–260, all cited. (Copy in Division 7.)

Hasbrouck et al., Jour. Soc. Motion Pict. Engrs. 29, No. 3, 1937, pp. 310–312, all cited. (Copy in Division 7.)